W. P. OSGOOD AND W. E. SMITH.
CEMENTING MACHINE.
APPLICATION FILED JAN. 14, 1919.
1,357,078.
Patented Oct. 26, 1920.
2 SHEETS—SHEET 1.
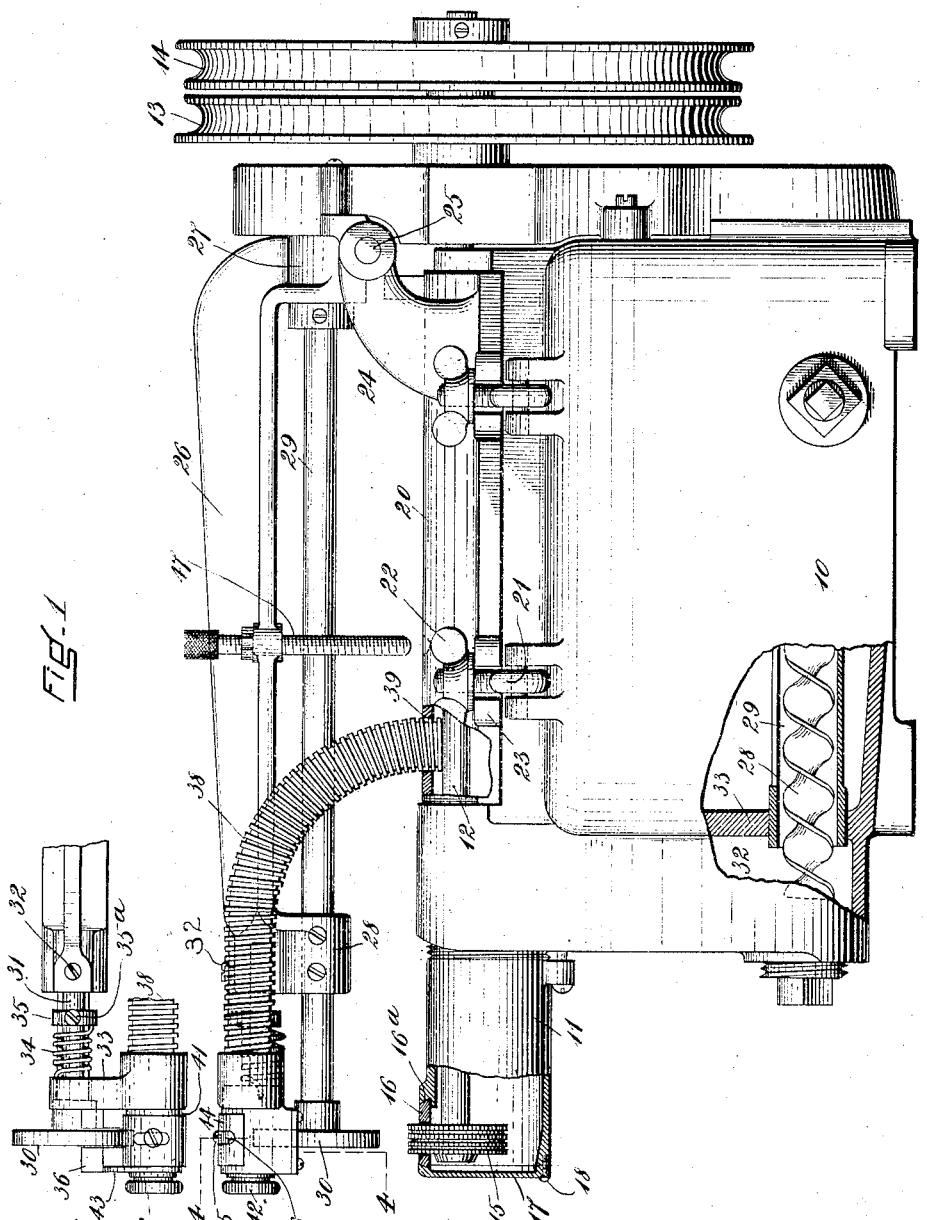
INVENTORS:
Walter P. Osgood
William E. Smith,
By Clyde L. Rogers
their ATTORNEY W. P. OSGOOD AND W. E. SMITH.
CEMENTING MACHINE.
APPLICATION FILED JAN. 14, 1919.

1,357,078.

Patented Oct. 26, 1920.
2 SHEETS—SHEET 2.

UNITED STATES PATENT OFFICE.

WALTER P. OSGOOD, OF MALDEN, AND WILLIAM E. SMITH, OF LYNN, MASSACHUSETTS, ASSIGNORS TO BOSTON MACHINE WORKS COMPANY, OF LYNN, MASSACHUSETTS, A CORPORATION OF MASSACHUSETTS.

CEMENTING-MACHINE.

1,357,078.                     Specification of Letters Patent.     Patented Oct. 26, 1920.

Application filed January 14, 1919. Serial No. 271,083.

*To all whom it may concern:*

Be it known that we, WALTER P. OSGOOD and WILLIAM E. SMITH, citizens of the United States, and residents, respectively, of Malden, in the county of Middlesex, and of Lynn, in the county of Essex, Commonwealth of Massachusetts, have invented an Improvement in Cementing-Machines, of which the following description, in connection with the accompanying drawings, is a specification, like characters on the drawings representing like parts in each of the several views.

This invention relates to machines for applying cement to materials such as leather employed in shoe manufacture, and more particularly to a type of machine employing a cement applying roll adapted to take up the cement from a closed container, and having coöperative therewith a backing or presser roll which also coöperates with the cement roll to feed the material forward. A principal object of the invention is to provide means whereby such backing or presser roll is kept clean and free from cement which would otherwise tend to accumulate thereon and soil the reverse side of the material. A further object is to equip such roll cleaning means with provision whereby the return of all cement cleared or scraped from the backing roll to the cement reservoir is insured and in a manner so that the return passage from the backing roll to the reservoir is kept sealed constantly by the returning cement itself thus preventing the access of air to the cement reservoir or the escape of the volatile solvent of the cement therefrom. To this end we provide an adjustable gate coöperative with the receiving end of the cement returning passage and associated with the backing roll and its cleaning device adapted to be adjusted so as to hold back just enough cement to keep the opening into the return passage sealed and without permitting any undue accumulation of unreturned cement. A further object of the invention is to provide means coöperative with the cement return passage from the backing roll adapted to facilitate and insure the movement of the viscous cement through the return passage into the reservoir. A still further object is to provide a mounting for the cement applying roll adapted to permit the application of cement thereby to a material piece such as a closed vamp, the cement roll for this purpose being preferably and as shown mounted in a horn or neck projected forwardly from the body of the reservoir, means being provided to insure a constant delivery of cement to such horn. The foregoing and other objects and advantages of the invention will more fully appear from the following detailed description, and the distinctive features of novelty will be pointed out in the appended claims.

Referring to the drawings:

Figure 1 is a side elevation, partly in section, of a cementing machine in which the invention is embodied;

Fig. 2 is a partial plan view showing the backing with the cement collecting and return device and the mounting therefor;

Figure 3:
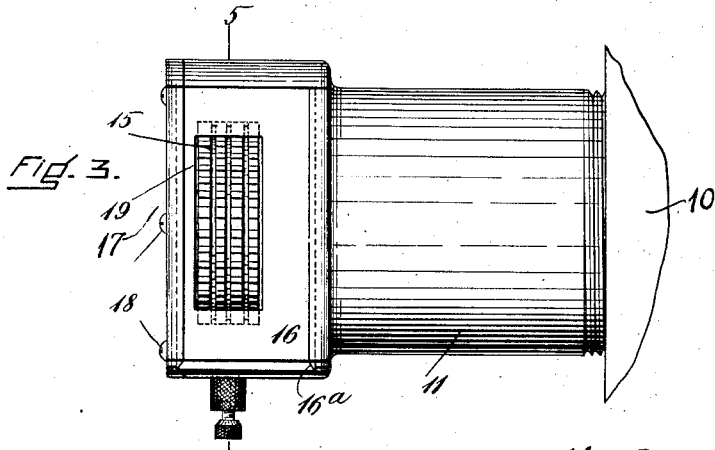
Fig. 3 is an enlarged partial plan view showing the cement applying roll and the horn in which the same is mounted.
Figure 4:
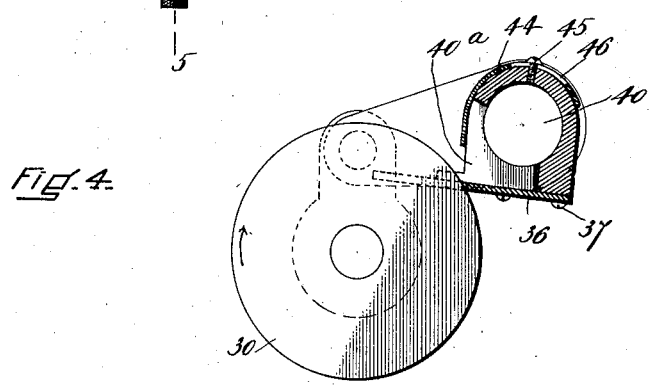
Fig. 4 is an enlarged detail section on line 4—4 of Fig. 1.
Figure 5:
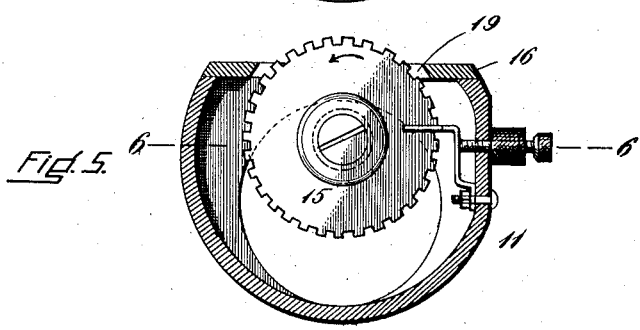
Fig. 5 is a transverse section on line 5—5 of Fig. 3.
Figure 6:
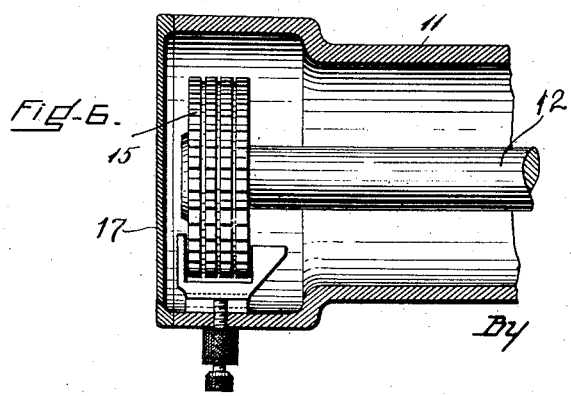
Fig. 6 is a horizontal section on line 6—6 of Fig. 5, the applying roll and its shaft being shown in elevation.

10 indicates the machine frame or base, the interior of which is hollow to constitute a cement reservoir. At the top and front thereof is a hollow projecting horn or neck 11, the interior of which communicates with the reservoir of the base through a suitable vertical passage at the front of the base, the cement reservoir being equipped with suitable means (not shown) for constantly delivering the cement upward through this passage into the horn 11 in a manner that may be generally similar to that shown in the patent to Brackett, No. 1,192,380 patented July 25, 1916 wherein the chamber there designated 16 is supplied similarly to the horn 11 in the present case. The horn 11 is shown as threaded into the base 10 though this is merely illustrative and the horn may be integral with the base or otherwise. The upper portion of the base frame has mounted in suitable bearings thereof a horizontally extending drive shaft 12 equipped at its outer end with suitable driving means shown as tight and loose pulleys 13, 14. The other end of this shaft extends through the horn 11 to near the outer end thereof where it has fixed thereon the cement applying roll 15 suitably grooved as shown, this roll projecting up through the top of the horn 11 to present an edge portion adapted to engage the material. The shaft 12 through suitable gearing (not shown) is adapted to operate a screw conveyer similarly as in the aforementioned Brackett patent so that in the operation of the machine a supply of cement is constantly being delivered into the horn 11 to be taken up by the roll 15. The outer portion of the top of the horn 11 is equipped with a flat table 16 slidably fitted to undercut ways $16^a$, the outer one of these ways being shown as formed at the top of a cap 17 fixed to the end of the horn 11 to constitute a closure therefor by means of screws 18. The table 16 is provided with a slot 19 through which projects a top peripheral portion of the cement roll 15. The top of the reservoir in the base 10 is closed by a cover plate 20 adapted to be locked closed by swingingly mounted screws 21 and wing nuts 22 which engage lugs 23 of the cover. At the rear of the base, spaced apart lugs 24 extend upwardly to constitute bearings for a transverse shaft 25 on which is mounted to swing the arm 26 which extends to the front of the machine. This arm is equipped at its rear and front ends with bearings 27, 28 respectively in which is rotatably mounted a shaft 29. The shaft 29 is in geared engagement (not shown) with the driving shaft 12 just back of and adjacent the pivot 25 and similarly as in the aforenamed Brackett patent. The shaft 29 has fixed at its forward end opposite the cement roll 15 a backing and presser roll 30 which being constantly driven as described is adapted to coöperate with the cement roll 15 as a feed roll for advancing the material. A rod or pin 31 is fitted to project from the end of the arm 26 above and in parallelism with the shaft 29, as shown in Fig. 2, and is adjustably clamped to said arm by a screw 32. Mounted to turn on the rod 31 is an arm 33 which is engaged by one end of a coil spring 34 mounted on the rod 31, the other end of said spring being anchored to a collar adjustably fixed on the rod 31 and clamped thereto by a screw $35^a$. Thus by turning the collar 35 on the rod 31 the spring 34 may be placed under more or less tension and hence the arm 33 is pressed downward to the extent required for causing proper engagement of a scraper plate 36 carried thereby with the backing roll, for performing its cleaning and cement clearing function. The scraper plate 36 which in a broader aspect typifies any suitable device for constantly cleaning and clearing the cement from the backing roll during the operative rotation thereof, is removably fixed to the bottom of the arm 33 by screws 37. The arm 33 also carries one end of a flexible cement return tube 38, the other free end whereof enters through a hole 39 in the cover 20, such tube end being thus held adjacent to, and slightly over, the driving shaft 12 wherefrom it results that the viscous cement discharging from said tube is wound on to the driving shaft 12 which thus tends to keep the cement moving constantly through the tube to clear the same. The arm 33 has a passage 40 therethrough with which the receiving end of the tube 38 communicates and into which the cement removed from the backing roll by the clearer 36 is delivered. For this purpose the arm 33 has a forward tubular extension or neck 41 constituting a continuation of the passage 40, the end thereof being closed by a detachable screw cap 42. This extension is formed with a cement receiving opening $40^a$ leading into the passage 40 just above or in advance of the clearer or scraper plate 36, this opening thus embracing and being opposite the peripheral portion of the roll 30 from which the cement is about to be cleared. The tubular extension 41 adjacent this opening $40^a$ in conjunction with the scraper plate 36 at the bottom in conjunction with an outer retaining flange 43 forms a shallow pocket around the opening $40^a$ adapted to hold a limited quantity of cement. In accordance with our invention means is provided whereby the extent of the opening $40^a$ may be varied and adjusted to a degree so that it will permit the cement cleared from the roll 30 to pass therethrough with only a constant slight excess accumulation of a relatively constant amount held in the pocket as described and serving to close and seal the opening against the ingress of air or the egress of the volatile solvent. For this purpose we provide an adjustable gate shown as an arcuate plate 44 mounted for adjustment on the extension 41 by means of a screw 45 passing through an elongated slot 46 of said plate whereby the gate may be moved to close said opening to a greater or less extent according to the character of the cement and the nature of the work being performed. The downward movement of the backing roll 30 is limited by an adjusting screw 47 which is threaded through a boss on the swinging frame 26, the lower end of this screw engaging the top of the cover plate 20 to constitute a downward stop for the arm 26 and hence the roll 30. Suitable means (not shown) may be provided for controlling by treadle or otherwise the swinging movement of the arm 26, one illustrative form of such means being shown in the Brackett patent named, and another form being shown in a type of machine similar to that herein described in the application of Osgood, Smith and Peabody, Serial No. 271,084, filed January 14, 1919. The described construction thus insures a constantly clean and cement-free condition of the operative portion of the presser roll 43 and provides for the constant return of the cement cleared therefrom into the reservoir in a manner so that the reservoir contents and returning cement as well, are kept constantly sealed and protected from exposure and drying out. The horn 11 as shown projects a substantial distance outward from the machine body with a restricted transverse dimension permitting closed work pieces to be slipped thereover and hence it is possible to handle closed work pieces such as endless vamps in a convenient and expeditious manner, this being as we believe a feature broadly new and which we desire to claim without further structural limitation. We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having described our invention, what we claim as new and desire to secure by Letters Patent is:

1. A cementing machine, comprising a cement container equipped with means for applying cement to a material, a backing member mounted to coöperate with said applying means, and means for constantly clearing said backing member of cement accumulations in the operation of the machine including a passage arranged and equipped to be normally sealed from the atmosphere for returning the cement to said container.

2. A cementing machine, comprising a cement container equipped with means for applying cement to a material, a backing roll movably mounted to coöperate with said applying means, means for constantly clearing said roll of cement in the operation of the machine including a passage for returning the cement to said container, and means for varying the dimension of said passage adjacent the entrance end thereof.

3. A cementing machine, comprising a cement container equipped with means for applying cement to a material, a backing roll movably mounted to coöperate with said applying means, a scraper for constantly clearing said roll of cement in the operation of the machine, and means for returning such cement to said container including a passage having a receiving opening embracing the periphery of said roll just in advance of said scraper, and an adjustable gate for varying the dimension of said opening whereby the cement may be caused to seal said opening.

4. A cementing machine, comprising a cement container equipped with a cement applying roll, a backing roll mounted for movement toward and from said applying roll and in geared connection therewith, a cleaning member mounted to coöperate with said backing roll, and means for returning cement cleaned from said roll to said container including a passage having an opening embracing the periphery of said roll just in advance of said cleaning member with a recess to permit a limited accumulation of cement, and an adjustable gate for partially closing said opening whereby the cement in said recess may be caused to seal the same.

5. A cementing machine, comprising a cement container equipped with an applying roll, a swinging arm equipped with a backing roll to coöperate with said applying roll, a cleaner member for said backing roll mounted under tension on said arm, and means carried by said arm for returning the cement cleaned from said roll including a flexible tube with an opening thereinto embracing the periphery of said roll just in advance of said cleaning member.

6. A cementing machine, comprising a closed cement reservoir equipped with an applying roll having a shaft extending through said reservoir, a backing member coöperative with said roll equipped with cement clearing means, and means for returning the cement cleared from said roll to said reservoir including a passage with a delivery end in proximity to and above said shaft whereby the turning of said shaft facilitates the return of the cement through said passage.

7. A cementing machine, comprising a cement container equipped with an applying roll, a swinging arm equipped with a backing roll to coöperate with said applying roll, a cleaner member for said backing roll mounted under tension on said arm, means carried by said arm for returning the cement cleaned from said roll including a flexible tube with an opening thereinto embracing the periphery of said roll just in advance of said cleaning member, and an adjustable gate also carried by said arm for varying the dimension of said opening whereby it may be sealed by the returning cement.

8. A cementing machine, comprising a machine base constituting a cement reservoir, and a horn constituting a cement chamber projecting therefrom and equipped with cement applying means, the extent of said horn adapting it to permit the placing of a closed vamp or the like thereover to engage said applying means.

9. A cementing machine, comprising a machine base constituting a cement reservoir, with a horn projecting therefrom adapted to permit the application of a closed vamp thereover, means for forcing cement from said reservoir into said horn, and a cement applying roll mounted in said horn and with a portion projecting through an opening thereof.

10. A cementing machine, comprising a base formed as a cement container, a cement chamber extending therefrom formed as a projecting horn adapted to permit a closed vamp or the like to be placed thereover, means for forcing cement from said container into said chamber, an applying roll mounted in said chamber with a portion thereof extending through an opening therein, and a backing roll coöperative with said roll.

In testimony whereof, we have signed our names to this specification.

WALTER P. OSGOOD.
WM. E. SMITH.